United States Patent
Roh

(10) Patent No.: US 11,522,906 B2
(45) Date of Patent: Dec. 6, 2022

(54) MALWARE DETECTION METHOD FOR PREVENTING EXECUTION OF MALWARE, METHOD FOR DETECTING DOMAIN GENERATION ALGORITHM, AND COMPUTER DEVICE THEREFOR

(71) Applicant: Somma, Inc., Seongnam-si (KR)

(72) Inventor: Yonghwan Roh, Yongin-si (KR)

(73) Assignee: Somma, Inc., Seongnam-si (KR)

( * ) Notice: Subject to any disclaimer, the term of this patent is extended or adjusted under 35 U.S.C. 154(b) by 100 days.

(21) Appl. No.: 17/120,868

(22) Filed: Dec. 14, 2020

(65) Prior Publication Data

US 2021/0194892 A1    Jun. 24, 2021

(30) Foreign Application Priority Data

Dec. 18, 2019  (KR) .......... 10-2019-0169816
Nov. 23, 2020  (KR) .......... 10-2020-0157670

(51) Int. Cl.
*H04L 9/40* (2022.01)
*H04L 61/2557* (2022.01)
*H04L 41/16* (2022.01)
*H04L 61/3015* (2022.01)
*H04L 61/4511* (2022.01)

(52) U.S. Cl.
CPC .......... *H04L 63/145* (2013.01); *H04L 41/16* (2013.01); *H04L 61/2557* (2013.01); *H04L 61/3025* (2013.01); *H04L 61/4511* (2022.05); *H04L 63/1416* (2013.01); *H04L 63/1433* (2013.01)

(58) Field of Classification Search
CPC . H04L 41/16; H04L 61/2557; H04L 61/3025; H04L 61/4511; H04L 63/1416; H04L 63/1433; H04L 63/145
See application file for complete search history.

(56) References Cited

U.S. PATENT DOCUMENTS

| | | | | |
|---|---|---|---|---|
| 8,762,298 | B1* | 6/2014 | Ranjan | G06F 21/552 |
| | | | | 706/12 |
| 9,781,139 | B2* | 10/2017 | Sofka | H04L 63/0281 |
| 10,198,579 | B2* | 2/2019 | Thakar | H04L 63/1425 |
| 10,270,806 | B2* | 4/2019 | Akcin | G06F 16/9566 |
| 10,469,511 | B2* | 11/2019 | Vasseur | G06N 5/043 |
| 2012/0047173 | A1* | 2/2012 | Thomas | G06F 16/285 |
| | | | | 707/777 |
| 2016/0381065 | A1* | 12/2016 | Xie | H04L 63/1425 |
| | | | | 726/23 |
| 2020/0059451 | A1* | 2/2020 | Huang | G06N 3/02 |
| 2020/0169570 | A1* | 5/2020 | Kleymenov | H04L 63/1416 |

* cited by examiner

*Primary Examiner* — Thomas J Dailey
(74) *Attorney, Agent, or Firm* — Studebaker & Brackett PC

(57) ABSTRACT

A malware detection method for preventing execution of malware, a method for detecting a domain generation algorithm, and a computer device therefor are provided. The malware detection method includes monitoring, by a processor of a computer, domain name system (DNS) query requests for all processes and replies to the query requests and counting, by the processor, the number of times of failure DNS query requests per unit process and determining, by the processor, malware.

20 Claims, 5 Drawing Sheets

MALWARE DETECTION METHOD FOR PREVENTING EXECUTION OF MALWARE, METHOD FOR DETECTING DOMAIN GENERATION ALGORITHM, AND COMPUTER DEVICE THEREFOR

CROSS-REFERENCE TO RELATED APPLICATIONS

A claim for priority under 35 U.S.C. § 119 is made to Korean Patent Application Nos. 10-2019-0169816 filed on Dec. 18, 2019 and 10-2020-0157670 filed on Nov. 23, 2020 in the Korean Intellectual Property Office, the entire contents of which are hereby incorporated by reference.

BACKGROUND

Embodiments of the inventive concept described herein relate to a malware detection method for preventing execution of malware, a method for detecting a domain generation algorithm, and a computer device therefor.

Some malware operates by receiving commands from a server of an attacker in a remote place and are executed by downloading additional malware.

When an address of an attacker server is input to malware, because an analyst analyzes an execution file and easily finds the server of the attacker, an attempt to access the server of the attacker is performed by means of a domain generation algorithm (DGA) which generates a server address of the attacker to be accessed.

FIG. 1 is a drawing schematically illustrating a DGA.

Malware randomly generates hundreds of domain addresses to thousands to tens of thousands of domain addresses a day by means of the DGA to access the generated domain addresses. Because an attacker previously knows a domain address generated under a specific condition such as a specific date and a specific time, he or she may prepare for the domain address in advance and may control remote malware.

Because it is possible for the attacker to hide one real domain address of the attacker in many fake domain addresses when using the DGA, the attacker may interrupt tracking and blocking.

A conventional DGA detection scheme is a scheme of detecting static characteristics, for example, detecting a pattern of a code implementing the DGA or detecting a pattern of a domain address generated by the DGA.

SUMMARY the present invention provides a malware detection method for preventing execution of malware, a method for detecting a domain generation algorithm capable of being used in malicious attacks, and a computer device therefor.

The specification is not limited to the above-described problems and other problems which are not described herein will become apparent to those skilled in the art from the following description.

According to an exemplary embodiment, a malware detection method performed in a computer may include monitoring, by a processor of the computer, domain name system (DNS) query requests for all processes and replies to the query requests and counting, by the processor, the number of times of failure DNS query requests per unit process and determining, by the processor, malware.

According to an exemplary embodiment, a method for detecting a domain generation algorithm, performed by a computer, may include monitoring, by a processor of the computer, a domain address translation request according to an Internet protocol, determining, by the processor, whether domain address translation is requested over the predetermined number of reference translation requests within a predetermined reference time, and determining, by the processor, that the domain generation algorithm is executed, when nonreplies of a reference rate or more occur from the translated domain addresses.

According to an exemplary embodiment, a computer device may include a processor and a memory storing a computer program configured to be executed by the processor. The computer program may perform a process of monitoring DNS query requests for all processes and replies to the query requests and a process of counting the number of times of failure DNS query requests per unit process and determining malware.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
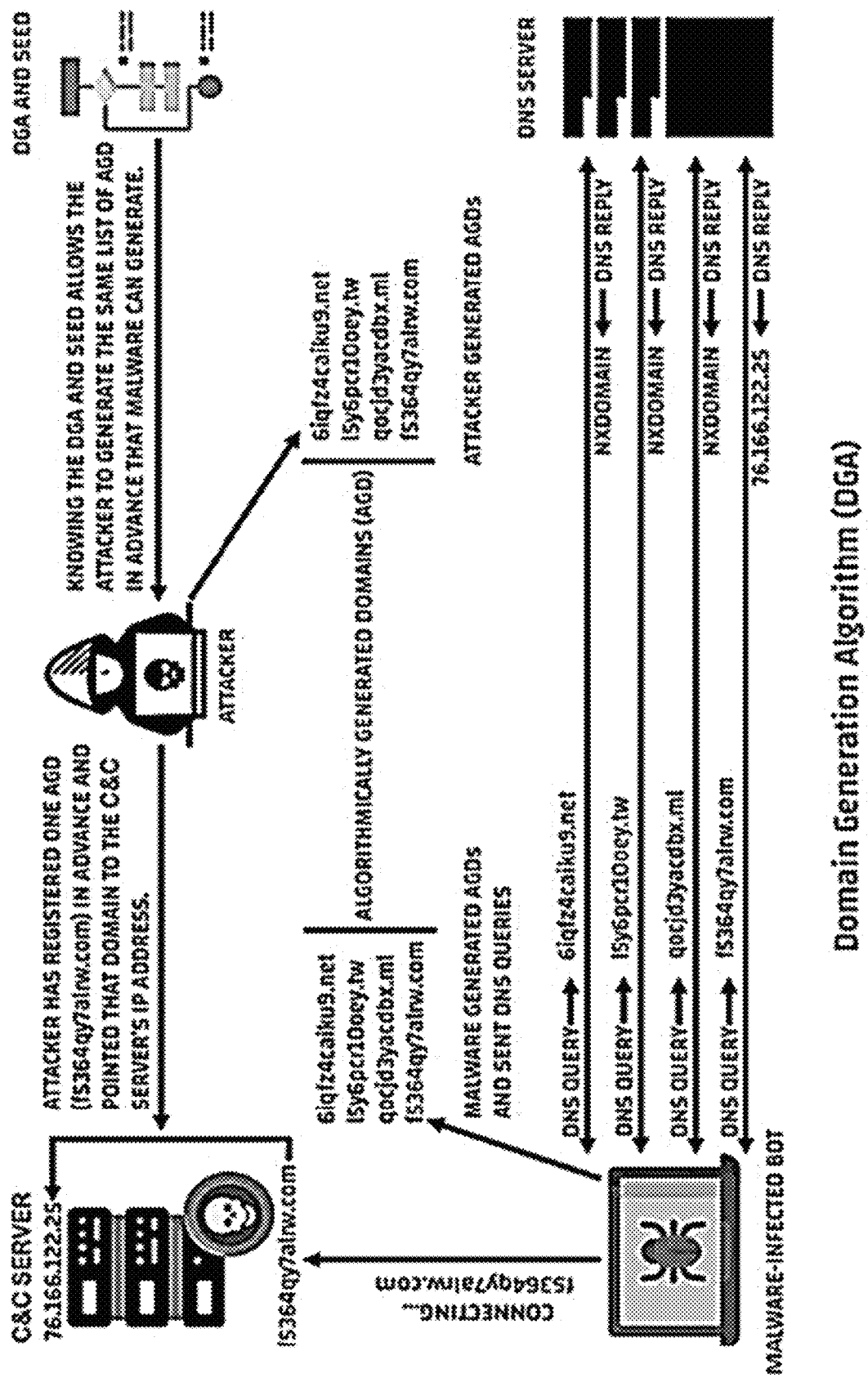
FIG. 1 is a drawing schematically illustrating a domain generation algorithm.

Advantages and features disclosed in the specification, and methods of accomplishing the same will become apparent with reference to embodiments described in detail below together with the accompanying drawings. However, the specification is not limited by embodiments disclosed hereinafter, and may be implemented in various forms. Rather, these embodiments are provided to so that this disclosure will be through and complete and will fully convey the concept of the specification to those skilled in the art, and the scope of the specification will only be defined by the appended claims.

Terms used in the specification are used to describe embodiments and are not intended to limit the scope of the specification. In the specification, the terms of a singular form may include plural forms unless otherwise specified. The expressions "comprise" and/or "comprising" used herein indicate existence of one or more other elements other than stated elements but do not exclude presence of additional elements. Like reference numerals designate like elements throughout the specification, and the term "and/or" may include each of stated elements and one or more combinations of the stated elements. The terms such as "first" and "second" are used to describe various elements, but it is obvious that such elements are not restricted to the above terms. The above terms are used only to distinguish one element from the other. Thus, it is obvious that a first element described hereinafter may be a second element within the technical scope of the inventive concept.

Unless otherwise defined herein, all terms (including technical and scientific terms) used in the specification may be used as the same meaning that is generally understood by a person skilled in the art to which the specification pertains. Also, terms which are defined in a dictionary and commonly used should be interpreted as not in an idealized or overly formal detect unless expressly so defined. Hereinafter, the present invention will be described in detail with reference to the accompanying drawings.

Figure 2:
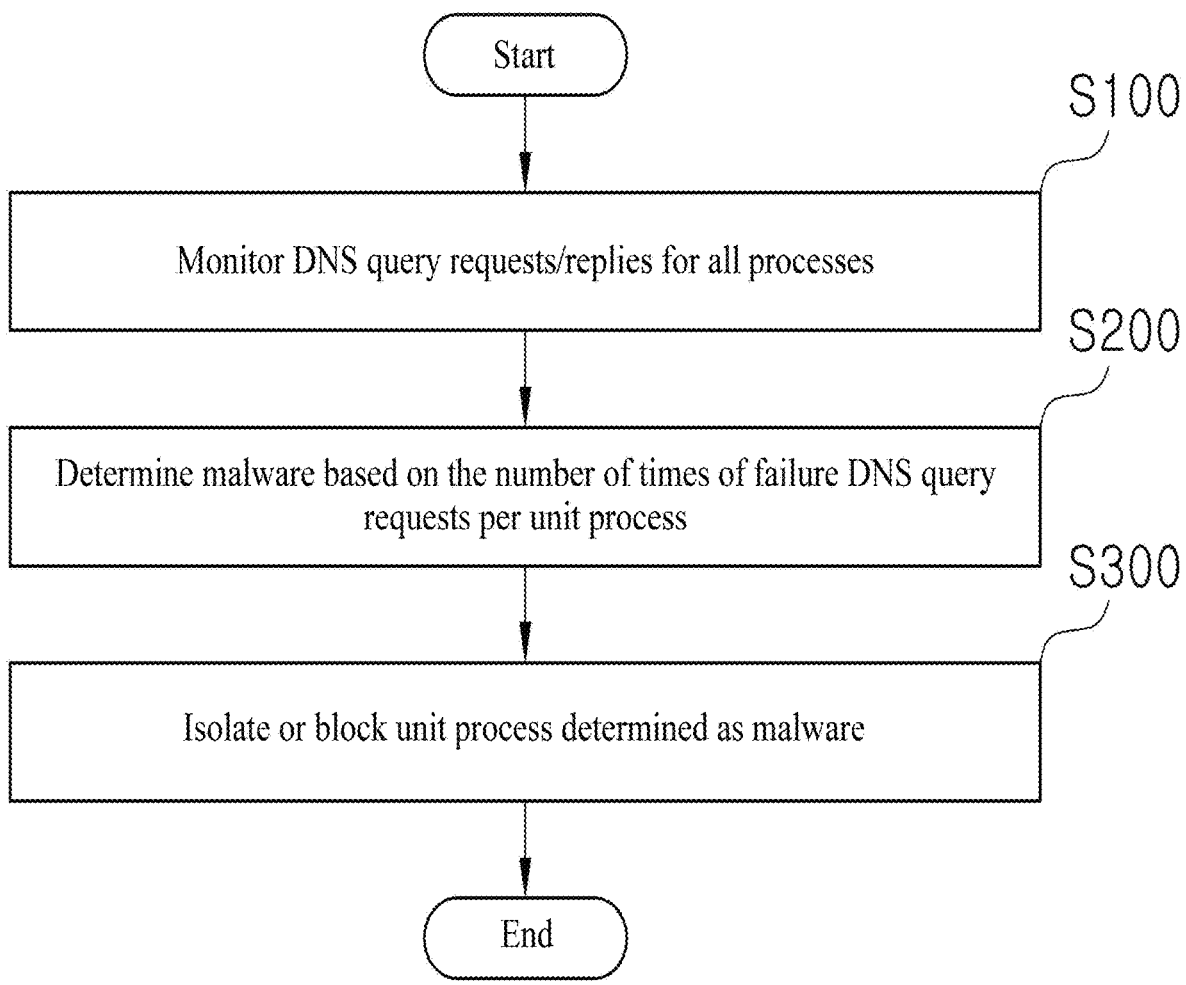
FIG. 2 is a flowchart illustrating a malware detection method according to the present invention.

FIG. 2 is a flowchart illustrating a malware detection method according to the present invention.

Referring to FIG. 2, the malware detection method may include monitoring (S100) domain name system (DNS) query requests/replies for all processes, determining (S200) malware based on the number of times of failure DNS query requests per unit process, and isolating or blocking (S300) a unit process determined as the malware.

The monitoring (S100) of the DNS query requests/replies for all the processes may include monitoring a query request for a domain name about which a PC inquires of a DNS server and a result of validity for the query request, rather than identifying a domain name generated by a specific DGA. Malware randomly generates hundreds of domain addresses to thousands to tens of thousands of domain addresses every day by means of a DGA to attempt to access the generated domain addresses and interrupts tracking and blocking by hiding one real domain address of an attacker among the domain addresses. In operation S100, a DNS query request/reply for each process may be monitored to determine whether there is malware.

The determining (S200) of the malware based on the number of times of failure DNS queries per unit process may be to determine malware depending to whether a specific process requests a DNS query, which failed, over a specified number of times during a specified time, rather than determining malware based on a static characteristic, for example, detecting a pattern of a code or detecting a string pattern of a domain address generated by the DGA.

A failure DNS query request count, which is a reference value for determining malware, may be determined based on whether it is performed over a predetermined number of times with a predetermined reference time. The predetermined reference time and the predetermined number of times may be input from the outside through a communication modem.

Such a failure DNS query request count may be an item for determining whether there is malware. When malware actually occurs, a learning data group may be formed in response to whether the malware is performed over a predetermined number of times within a predetermined reference time, and a network may be learned using artificial intelligence such that a predetermined reference time and a predetermined number of times are set for each malware based on the learning data. The predetermined reference time and the predetermined number of times, which are learned through such an artificial intelligence network, may be input from the outside through the communication modem.

The isolating or blocking (S300) of the unit process determined as the malware may be to basically block an operation of the malware by blocking or isolating the unit process based on whether the failure DNS query request count, which is a reference value for determining malware, is performed over a predetermined number of times within a predetermined reference time.

Figure 3:
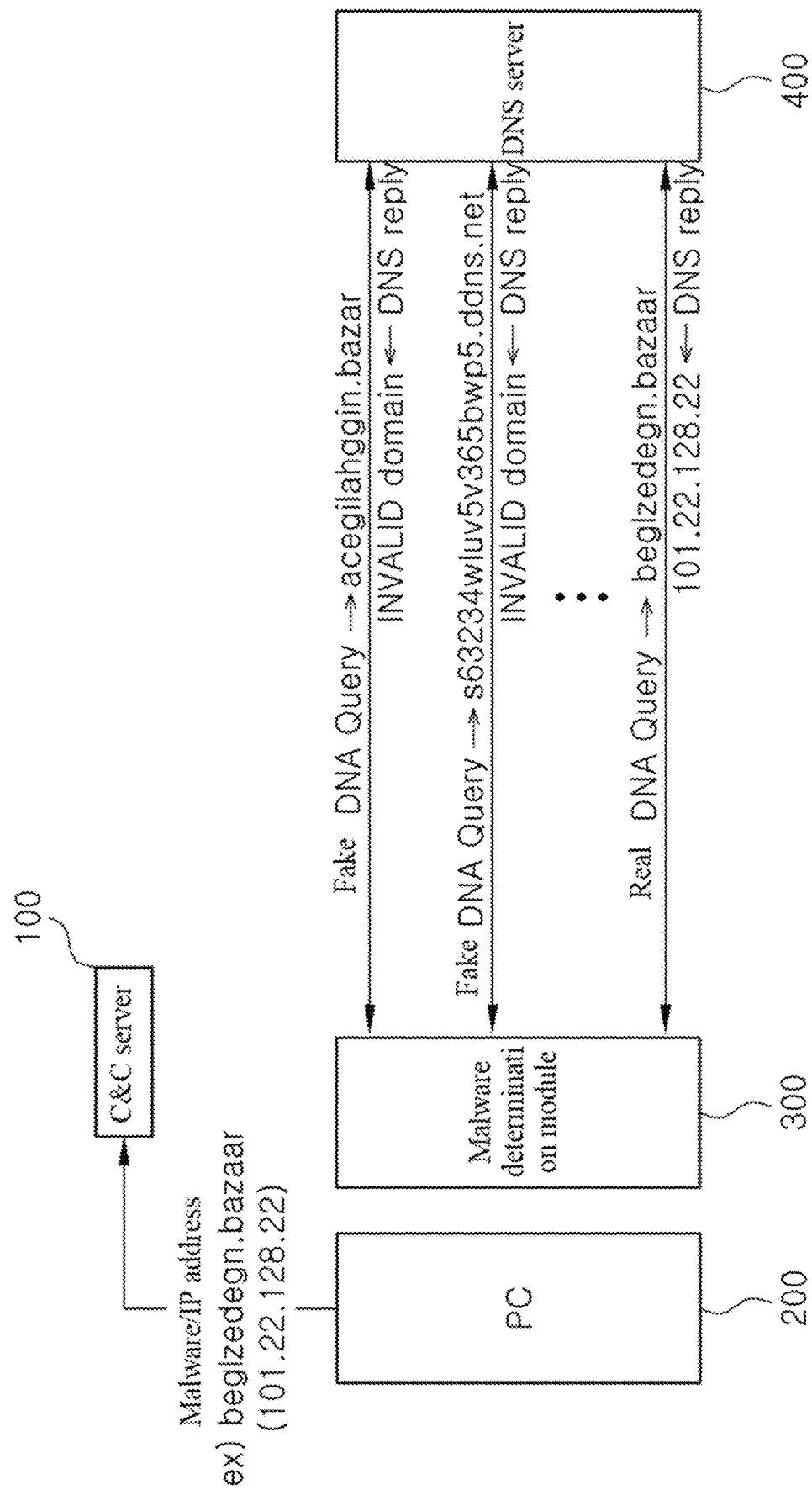
FIG. 3 is a drawing illustrating a system for providing a malware detection method according to the present invention.

FIG. 3 is a drawing illustrating a system for providing a malware detection method according to the present invention.

Referring to FIG. 3, a command and control (C&C) server 100 may be controlled directly by a malware operator or may be controlled as malware in hardware compromises with malware in the hardware. The C&C server 100 may be a server which commands and controls to transmit spam mail to a PC 200 infected by a malicious bot or perform a distributed denial-of-service (DDos) attack or the like, which may be an entity mainly operated by a hacker.

The C&C server 100 may randomly generate many domain addresses (hundreds to tens of thousands of domain addresses) every day by means of a domain generation algorithm (DGA) (DNS based domain fluxing) and may bypass access prevention preventing malware from receiving commands from the C&C server 100 based on the generated domain addresses by attempting to access the domain addresses generated by the DGA.

The infected PC 200 may transmit a random domain address generated by the DGA to a DNS server 400. The DNS server 400 may transmit a reply to whether a corresponding DNS query request succeeds or fails to the PC 200. Referring to FIG. 3, most of many requests for the random domains generated by the DGA may be determined as unsuitable requests (invalid domains). In the meantime, malware may be authorized based on an IP address and a domain address of the C&C server 100 of the malware, which are hard-coded and hidden, to access the C&C server 100.

Rather than determining malware by means of the DGA or through determination of coding, as compared with a DGA scheme based on the assumption of failure request replies to many DNS queries, a malware determination module 300 according to the present invention may determine cases where a DNS failure reply is greater than or equal to the unit number of times per unit time for each unit process as malware, thus simply and efficiently blocking malware.

Although a C&C server operator or a hacker converts the DGA or coding, because failure request replies to many DNS queries are not finally changed, the malware determination module 300 according to the present invention may always easily block malware irrespective of a change in the DGA scheme.

Figure 4:
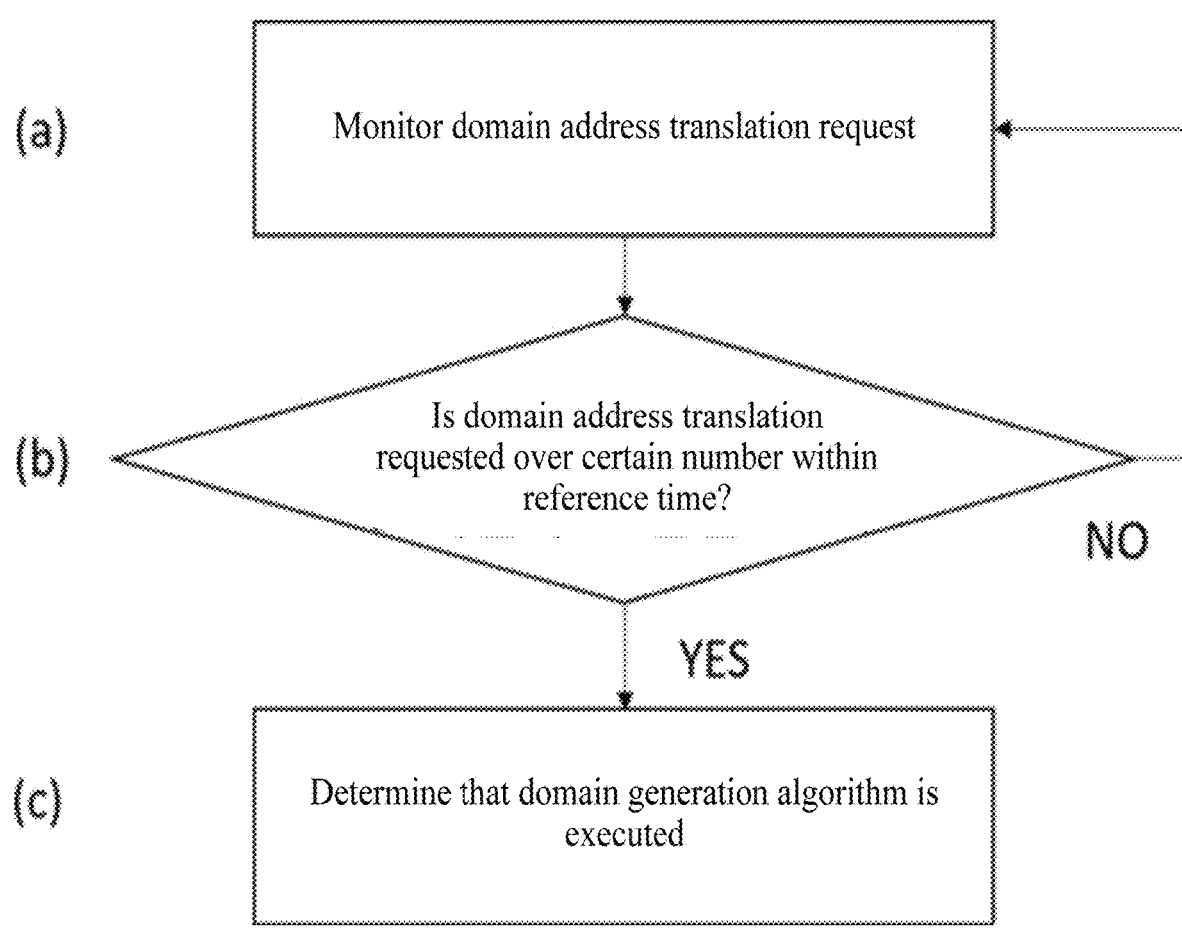
FIG. 4 is a flowchart illustrating a method for detecting a domain generation algorithm according to the present invention.

FIG. 4 is a flowchart illustrating a method for detecting a domain generation algorithm according to the present invention.

Referring to FIG. 4, first of all, in operation (a), a processor may monitor a domain address translation request according to an Internet protocol. In operation (b), the processor may determine whether domain address translation is requested over the predetermined number of reference translation requests within a predetermined reference time. This is because malware generates many domain addresses by means of a DGA and performs domain address translation requests to access a corresponding domain address.

According to the present invention, at least one of the predetermined reference time, the number of reference translation requests, and a reference rate may be determined by a user input.

Furthermore, according to the present invention, at least one of the predetermined reference time, the number of reference translation requests, and a reference rate may be input from the outside through a communication modem.

Furthermore, according to the present invention, at least one of the predetermined reference time, the number of reference translation requests, and a reference rate may be calculated on the basis of an average domain address translation request.

When the domain address translation is not requested over the predetermined number of reference translation requests within the predetermined reference time ('NO' of operation (b)), the processor may proceed to operation (a). Thus, operation (a) and operation (b) may be repeatedly performed.

On the other hand, when the domain address translation is requested over the predetermined number of reference translation requests within the predetermined reference time ('YES' of operation (b)), the processor may proceed to operation (c).

When nonreplies of a reference rate or more occur from the translated domain addresses, in operation (c), the processor may determine that the DGA is executed.

This is because very many domain address translation requests are generated within very short time and most replies are invalid domain addresses, unlike a general form which accesses a website through a browser. Thus, when such an action occurs, the processor may determine that a specific process attempts to perform access by the DGA.

Figure 5:
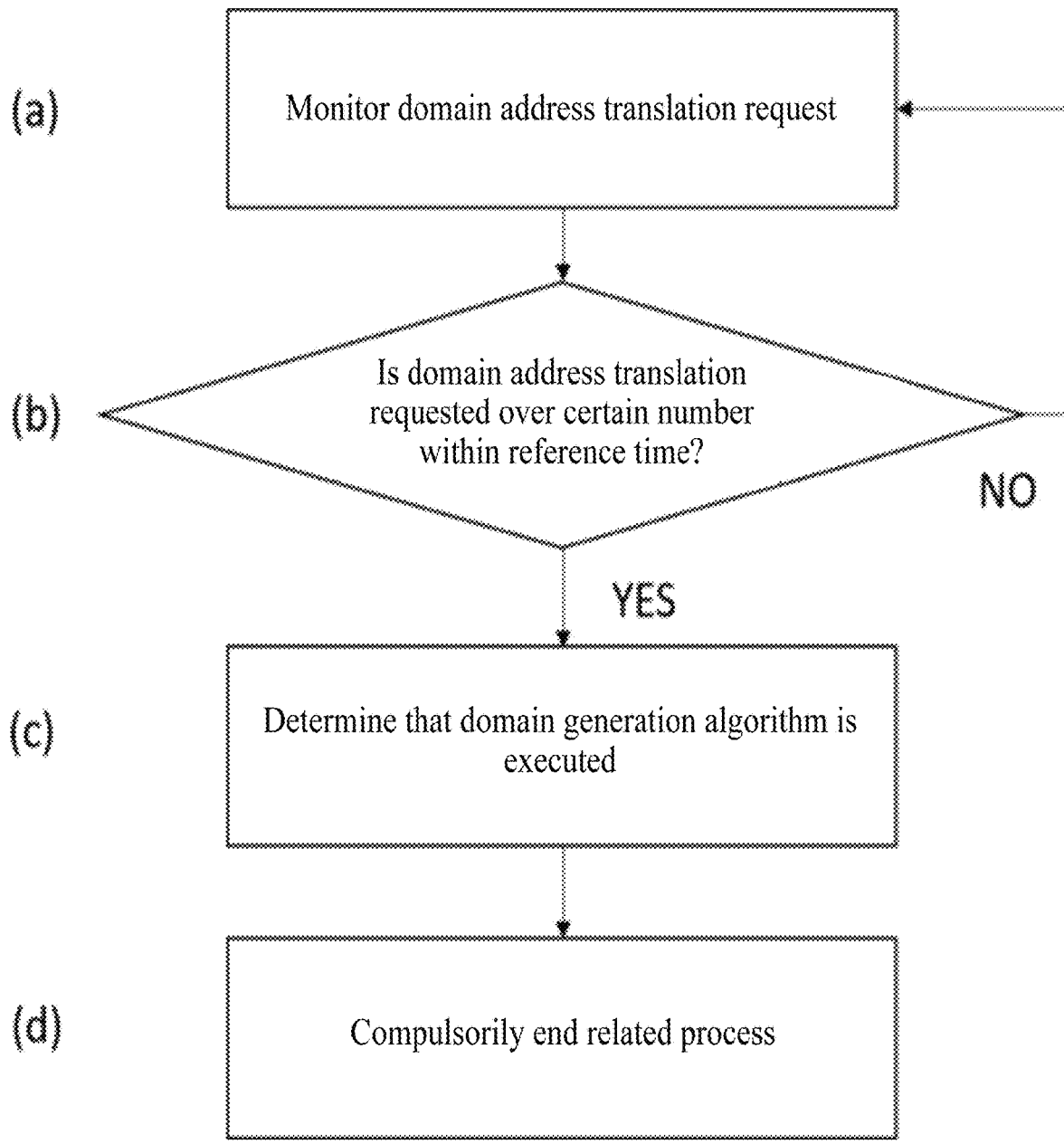
FIG. 5 is a flowchart illustrating a method for detecting a domain generation algorithm including compulsorily ending a process according to the present invention.

FIG. 5 is a flowchart illustrating a method for detecting a DGA including compulsorily ending a process according to the present invention.

Referring to FIG. 5, in operation (d) of the method for detecting the DGA according to the specification, a processor may compulsorily end a process of executing the DGA.

The malware detection method and the method for detecting the DGA according to the specification may be implemented in the form of a computer program, which is written to perform the respective operations and is stored in a computer-readable storage medium.

For the computer to read the program and execute the methods implemented with the program, the above-mentioned program may include a code coded into a computer language such as C/C++, C#, JAVA, Python, or a machine language readable through a device interface of the computer by a processor (CPU) of the computer. Such a code may include a functional code associated with a function and the like defining functions necessary for executing the methods and may include a control code associated with an execution procedure necessary for the processor of the computer to execute the functions according to a procedure. Further, such a code may further include a code associated with memory reference about whether additional information or media necessary for the processor of the computer to execute the functions is referred at any location (address number) of an internal or external memory of the computer. Further, if it is necessary for the processor of the computer to communicate with any computer or server located in a remote place to execute the functions, the code may further include a communication related code about how communication is performed with any computer or server located in a remote place using a communication module of the computer and whether to transmit and receive any information or media upon communication.

The medium may refer to a device-readable medium which stores data on a semipermanent basis rather than a medium, such as a register, a cache, or a memory, which stores data during a short moment. The medium may refer to a device-readable medium which stores data on a semipermanent basis rather than a medium, such as a register, a cache, or a memory, which stores data during a short moment. In other words, the program may be stored in various storage media on various servers accessible by the computer or various storage media on the computer of the user. Further, the medium may be distributed to a computer system connected over a network and may store a computer-readable code on a distributed basis.

According to the present invention, unlike an existing technology of detecting a domain by the DGA using a characteristic of a previously generated domain name string, detection is possible when a domain name is generated by means of a new algorithm by detecting whether the DGA is used through the DNS translation related action itself of the processor. For example, although an algorithm is changed, malware may be determined by determining a frequency of each of a plurality of invalid domain translation requests per time.

The effects of the inventive concept are not limited to the above-described effects and other effects which are not described herein will become apparent to those skilled in the art from the following description.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A malware detection method performed in a computer, the malware detection method comprising:
   monitoring, by a processor of the computer, domain name system (DNS) query requests for all processes and replies to the query requests;
   counting, by the processor, the number of times of failure DNS query requests per unit process;
   determining, by the processor, when failure DNS query requests are counted per unit process over a predetermined number of times within a predetermined reference time, that a malware is occurred;
   in response to the occurrence of the malware, generating, by the processor, a learning data group including information regarding whether the malware is performed over a predetermined number of times within a predetermined reference period of time; and
   performing, by the processor, training of a network by an artificial intelligence based on the generated learning data group, to set an updated predetermined reference period time and an updated predetermined number of times for a respective malware.

2. The malware detection method of claim 1, wherein the determining includes:
   determining, by the processor, the malware, when failure DNS query requests are counted per unit process over a predetermined number of times within a predetermined reference time.

3. The malware detection method of claim 2, wherein the predetermined reference time and the predetermined number of times are received from an outside of the computer, through a communication modem of the computer.

4. The malware detection method of claim 2, wherein the predetermined reference time and the predetermined number of times are learned through artificial intelligence.

5. The malware detection method of claim 1, further comprising:
   isolating or blocking, by the processor, a unit process determined as the malware.

6. A method for detecting a domain generation algorithm, performed by a computer, the method comprising:
- monitoring, by a processor of the computer, a domain address translation request according to an Internet protocol;
- determining, by the processor, whether domain address translation is requested over a predetermined number of reference translation requests within a predetermined reference time;
- determining, by the processor, that the domain generation algorithm is executed, when nonreplies of a reference rate or more occur from the translated domain addresses;
- in response to the execution of the domain generation algorithm, generating, by the processor, a learning data group including information regarding whether the domain address translation is requested over the predetermined number of reference translation requests within the predetermined reference time; and
- performing, by the processor, training of a network by an artificial intelligence based on the generated learning data group, to set an updated predetermined reference period time and an updated predetermined number of reference translation requests.

7. The method of claim 6, wherein the predetermined reference time, the number of the reference translation requests, and the reference rate are determined by a user input.

8. The method of claim 6, wherein the predetermined reference time, the number of the reference translation requests, and the reference rate are received from an outside of the computer, through a communication modem of the computer.

9. The method of claim 6, wherein the predetermined reference time, the number of the reference translation requests, and the reference rate are calculated on the basis of an average domain address translation request.

10. The method of claim 6, further comprising:
- compulsorily ending, by the processor, a process of executing the domain generation algorithm.

11. A computer device, comprising:
- a processor; and
- a memory storing a computer program configured to be executed by the processor,
- wherein the computer program performs
  - a process of monitoring DNS query requests for all processes and replies to the query requests,
  - a process of counting the number of times of failure DNS query requests per unit process and determining malware,
  - a process of determining, by the processor, when failure DNS query requests are counted per unit process over a predetermined number of times within a predetermined reference time, that a malware is occurred,
  - a process of, in response to the occurrence of the malware, generating, by the processor, a learning data group including information regarding whether the malware is performed over a predetermined number of times within a predetermined reference period of time, and
  - a process of performing, by the processor, training of a network by an artificial intelligence based on the generated learning data group, to set an updated predetermined reference period time and an updated predetermined number of times for a respective malware.

12. The computer device of claim 11, wherein the computer program determines the malware when failure DNS query requests are counted per unit process over a predetermined number of times within a predetermined reference time, in performing the monitored processes.

13. The computer device of claim 12, wherein the predetermined reference time and the predetermined number of times are received from an outside of the computer, through a communication modem of the computer device.

14. The computer device of claim 12, wherein the predetermined reference time and the predetermined number of times are learned through artificial intelligence provided in the computer device.

15. The computer device of claim 11, wherein the computer program further performs a process of isolating or blocking a unit process determined as the malware.

16. The computer device of claim 11, wherein the computer program further performs
- a process of monitoring a domain address translation request according to an Internet protocol,
- a process of determining whether domain address translation is requested over a predetermined number of reference translation requests within a predetermined reference time, and
- a process of determining that a domain generation algorithm is executed, when nonreplies of a reference rate or more occur from the translated domain addresses, to detect the domain generation algorithm.

17. The computer device of claim 16, wherein the predetermined reference time, the number of the reference translation requests, and the reference rate are determined by a user input.

18. The computer device of claim 16, wherein the predetermined reference time, the number of the reference translation requests, and the reference rate are received from an outside of the computer, through a communication modem of the computer device.

19. The computer device of claim 16, wherein the predetermined reference time, the number of the reference translation requests, and the reference rate are calculated on the basis of an average domain address translation request.

20. The computer device of claim 16, wherein the computer program further performs a process of compulsorily ending a process of executing the domain generation algorithm.

* * * * *